H. W. FELLOWS.
INTERMITTENT GRIP DEVICE.
APPLICATION FILED JUNE 23, 1910.

1,005,182.

Patented Oct. 10, 1911.

Witnesses:—

Inventor.
Hugh William Fellows.

UNITED STATES PATENT OFFICE.

HUGH WILLIAM FELLOWS, OF LOS ANGELES, CALIFORNIA, ASSIGNOR TO FELLOWS DIRECT POWER TRANSMISSION COMPANY, OF LOS ANGELES, CALIFORNIA, A CORPORATION OF ARIZONA TERRITORY.

INTERMITTENT-GRIP DEVICE.

1,005,182.  Specification of Letters Patent.  Patented Oct. 10, 1911.

Application filed June 23, 1910. Serial No. 568,548.

*To all whom it may concern:*

Be it known that I, HUGH WILLIAM FELLOWS, a citizen of the United States, residing at Los Angeles, in the county of Los Angeles and State of California, have invented new and useful Improvements in Intermittent-Grip Devices, of which the following is a specification.

My invention relates to improvements in intermittent grip devices, and the present application is to broadly and specifically describe and claim the intermittent grip device which is shown in a co-pending application filed June 23, 1910, Serial No. 568,549.

The object of the intermittent grip device is to improve the gripping and wearing qualities of the oscillatory driver whereby the driving element cannot slip with respect to the driven element.

Other objects relate to the details of construction, which will be pointed out in the following description.

Figure 1:
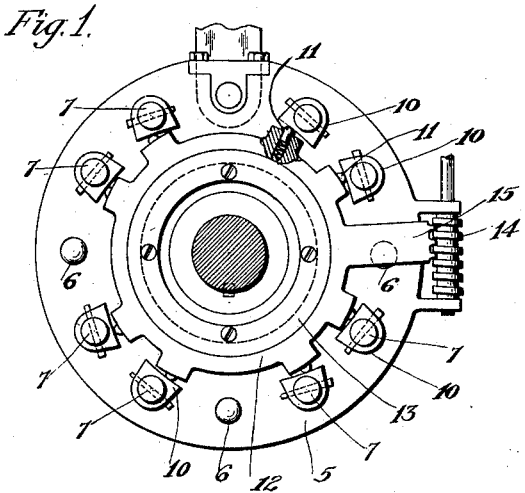
Figure 4:
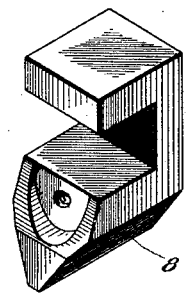
Figure 2:
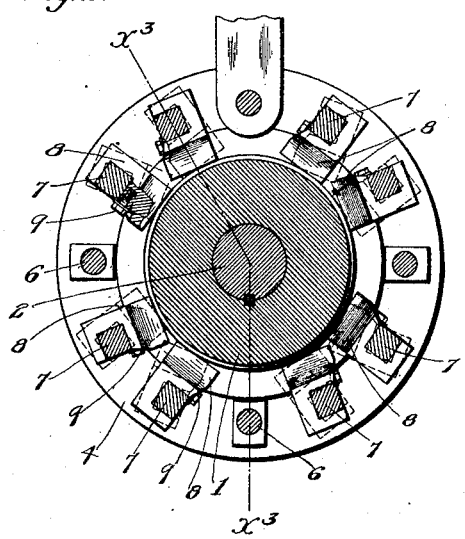
Figure 3:
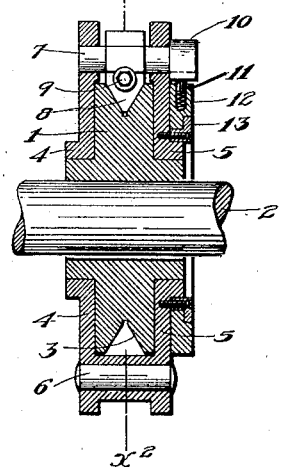

Referring to the drawings: Figure 1 is a side elevation of the oscillatory driver. Fig. 2 is a section on line $x^2$—$x^2$ Fig. 3. Fig. 3 is a section on line $x^3$—$x^3$ Fig. 2. Fig. 4 is a perspective of one of the gripping wedges.

The oscillatory driver consists of three units, each unit comprising, as shown in Figs. 1, 2 and 3, a disk 1 fixed on the driven shaft 2, the disk having a V-shaped groove 3 in its periphery. The disk 1 is shouldered on each side and loosely mounted thereon are two rock plates 4 and 5 which are secured together by rivets 6. A series of shafts 7 extends through the two rock plates 4 and 5 and the center portion of each shaft 7 is square, as shown in Fig. 2. Adjustably secured on the squared portion of each shaft 7 is a gripping wedge 8, shown in detail in Fig. 4, the wedge shaped portion of which lies within the groove 3 of the disk 1, the gripping wedge being detachably secured to the shaft 7 by a screw 9, the head of which projects over the edge of the shaft 7, so that by removing the bolt 9 of any gripping wedge, the latter may be slipped out and replaced quickly without taking apart any of the other elements. On one end of each shaft 7 is secured a tilt block 10, pressing against the inner face of which is a spring pressed stud 11 slidable radially in a shift ring 12, which is revolubly secured to the rock plate 5 by a flanged ring 13. When the shift ring 12 lies in the position shown in Fig. 1, each stud 11 stands at one side of the adjacent shaft 7 and presses against the tilt block 10 and holds the associated wedge block 8 tilted, so that one edge thereof is nearly radial, as shown in Fig. 2, and that side of the wedge block is in contact with the groove 3. When the shift ring 12 is moved to mid position, each stud 11 stands directly in line with the adjacent shaft 7 and holds the tilt block 10 in central position, so that the associated gripping wedge is held in central position and its wedge portion is out of contact with the groove 3. When the shift ring is in the opposite position from that shown in Fig. 1, the tilt blocks 10 will be tilted in the opposite direction and the wedge blocks 8 will all contact at their opposite sides with the groove 3, as indicated in dotted lines in Fig. 2. The shift ring 12 is adjusted to either of these three positions by a worm 14 which meshes with a toothed arm 15.

The wedge block is shorter between its shaft and the groove than the space between the shaft and groove so that when in central position the wedge does not contact with the groove. When the wedge is tilted either way it cannot be moved beyond such tilted position because the distance between the center of the shaft 7 and either corner of the wedge is greater than the distance between the center of the shaft 7 and the nearest point of the groove. Such difference, however, is slight and is what causes the wedge to be drawn into more intimate engagement with the groove by the friction thereof than it would be by the mere pressure produced by the spring pressed pins 11.

As the rock plates 5 are oscillated they move the gripping wedges back and forth in the groove 3 and the wedges grip the groove during the movement in one direction, thereby driving the disk 1 in that direction, while during the return oscillation the gripping wedges do not grip the groove but swing free and do not retard or reverse the direction of the disk 1. Obviously, the direction of rotation imparted to disk 1 will depend upon the position into which the tilt blocks 10 are shifted. When the tilt blocks 10 are held in mid position, the gripping edges are out of contact with the groove 3, and although the rock plates continue to oscillate, no movement will be imparted to the disk 1. Owing to the wedging action of the gripping wedges in groove 3, they are forced therein very tightly during the driving stroke and thus positively drive the disk. During the recovery stroke when driving forward or driving reversely, there is no tendency for the gripping wedges to be forced into wedging contact in the groove 3.

What I claim is:—

1. An intermittent grip device comprising a disk provided with a V-shaped groove, a series of wedge-shaped blocks engaging said groove, an oscillating plate carrying said blocks, a shift ring, a series of spring pressed studs in the shift ring, shafts in the oscillating plate supporting the wedge blocks, and tilt blocks on the shafts bearing against the respective studs.

2. An intermittent grip device comprising a disk provided with a V-shaped groove, a pair of oscillating plates movable concentrically with respect to the disk, a series of shafts revoluble in the disks, each shaft having a squared portion, a series of wedge-shaped blocks, each block having a square notch fitting the squared portion of the associated shaft and detachable laterally therefrom, tilt blocks on the shafts, a shift ring revoluble with respect to the oscillating plates, and a series of spring pressed studs in the shift ring bearing against the respective tilt blocks.

In testimony whereof, I have hereunto set my hand at Los Angeles, California, this 14th day of June 1910.

HUGH WILLIAM FELLOWS.

In presence of—
G. T. HACKLEY,
FRANK L. A. GRAHAM.

Copies of this patent may be obtained for five cents each, by addressing the "Commissioner of Patents, Washington, D. C."